United States Patent [19]

Mietrach

[11] Patent Number: 4,674,675
[45] Date of Patent: Jun. 23, 1987

[54] METHOD OF BONDING TITANIUM OR TITANIUM ALLOY TO AN IRON-NICKEL ALLOY

[75] Inventor: Dietmar Mietrach, Ganderkesee, Fed. Rep. of Germany

[73] Assignee: Messerschmitt-Boelkow-Blohm GmbH, Bremen, Fed. Rep. of Germany

[21] Appl. No.: 576,453

[22] Filed: Feb. 2, 1984

[30] Foreign Application Priority Data

Feb. 15, 1983 [DE] Fed. Rep. of Germany ....... 3305106

[51] Int. Cl.$^4$ .......................................... B23K 20/16
[52] U.S. Cl. .................................... 228/194; 228/195; 228/208; 228/263.16
[58] Field of Search ............... 228/194, 195, 198, 208, 228/209, 210, 263.16

[56] References Cited

U.S. PATENT DOCUMENTS 2,786,265  3/1957  Keay ........................ 228/263.16 X
2,908,969  10/1959  Wagner ..................... 228/263.16 X

FOREIGN PATENT DOCUMENTS 1286   1/1981  Japan ................................ 228/194
71590  6/1981  Japan ................................ 228/194

Primary Examiner—Robert P. Olszewski
Attorney, Agent, or Firm—Ralf H. Siegemund

[57] ABSTRACT

Appropriately cleaned titanium or titanium alloy and iron-nickel alloy parts are bonded together to obtain a compound part by providing particular metallic layers in between them and diffusion welding the assembly together. The layer sequence is critical whereby vanadium is used always adjacent the titanium part and chromium or iron or nickel is used adjacent the iron-nickel part whereby chromium and iron can be directly bonded to the vanadium layer; in the case of nickel either chromium or tungsten and platinum are interposed.

13 Claims, 12 Drawing Figures

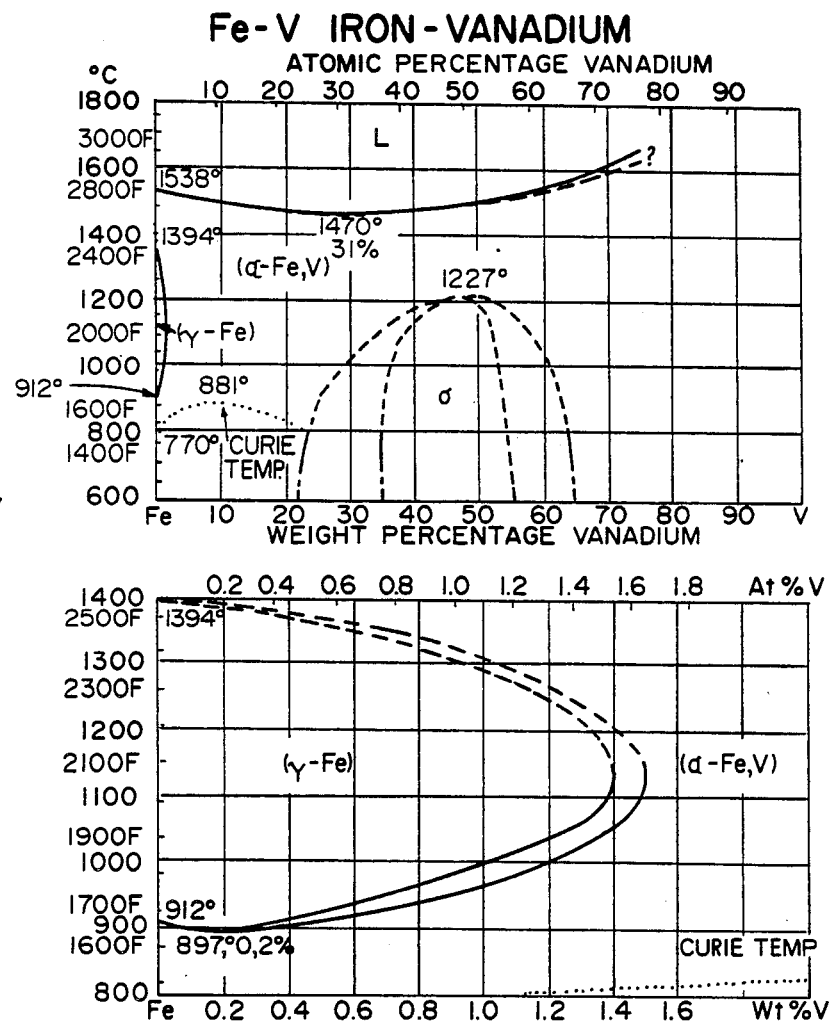
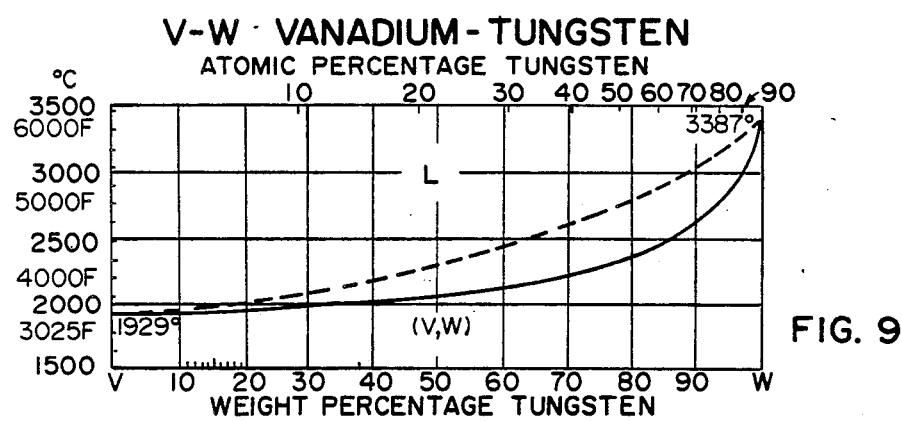
FIG. 8
FIG. 9 a)

b)

c)

d)

METHOD OF BONDING TITANIUM OR TITANIUM ALLOY TO AN IRON-NICKEL ALLOY

BACKGROUND OF THE INVENTION

The present invention relates to a method for bonding titanium or a titanium alloy part to an iron-nickel alloy part, for example of the type having equal proportions of nickel and iron.

The bonding of titanium to an iron-nickel alloy, for example, an alloy known under the designation Permenorm having usually equal parts of iron and nickel has been unsatisfactory in accordance with the previously employed methods. The reason of failure is to be found in the particular metallurgical conditions as well as in particular phenomena which occur in the practicing of prior art methods. Herein, for example, one has to consider the formation of brittle intermetallic phases as well as low melting eutectic phases which have a detrimental effect upon critical properties of the resulting products such as strength, extension coefficient and sealing against high vacuum conditions. This particular problem occurs in pure titanium as well as in titanium alloys.

The combination of titanium or titanium alloys with an iron-nickel alloy in a compound part is, for example, used in the space and aircraft industry but also in some areas of general mechanical engineering, in nuclear power technology and electrical engineering. The physical combination of titanium or a titanium alloy with a nickel-iron alloy in one part occurs, for example, wherever a transition from titanium or from titanium containing components to iron-nickel components is to be provided for. However, these combination materials are used occasionally as such, for example, in valve flanges and valve seats in magnetically operated valves, in control drives and propulsion systems and so forth, i.e. wherever a wide utilization of titanium is advantageous for reasons of its low weight.

DESCRIPTION OF THE INVENTION

It is an object of the present invention to provide a new and improved method for bonding titanium or a titanium alloy to an iron-nickel alloy under utilization of diffusion welding and under further utilization of metallic intermediate layers or lamina. The titanium or titanium alloy portion of the resulting product can be connected to other titanium parts in a conventional manner, for example, through bolting, soldering or electronically welding while analogously iron-nickel parts can be connected to the iron-nickel portion of the resulting products in an analogous fashion, i.e. through bolting, soldering or electron-beam welding.

In accordance with the preferred embodiment of the present invention, it is suggested to provide bonding between titanium or titanium alloy and an iron-nickel alloy by means of diffusion welding and under utilization of a particular sequence of intermediate layers which, as will be described more fully below, has to follow very rigidly particular rules because in the case of any deviation from these rules, one still may provide for some bonding but will inevitably encounter brittle intermetallic phases which immediately establish weak points in the part and form a local drop in strength and extendability. Any subsequent working involving particularly the application of heat such as soldering or welding will invariably increase any brittleness in any layer or interface and extends or enhances their growth which, of course, will further reduce strength and extension. On the other hand, whenever the prescribed layering sequence is observed, such a part will in fact be able to withstand a high thermal load as it may occur, for example, during electron beam welding or high temperature soldering or during high operating temperature of the completed part and brittle intermetallic phases do not have to be expected.

Therefore, in the preferred embodiment of the present invention, a particular layer sequence is to be provided between titanium or a titanium alloy and an iron-nickel alloy. It is suggested that a vanadium layer adjoins the titanium part and a chromium, nickel or iron layer adjoins the iron-nickel alloy part whereby chromium or iron is used if no further intermediate layer is provided for, in which case the chromium or iron layer joins directly the vanadium layer. In the case a nickel layer is used adjoining the iron-nickel alloy, either a chromium layer is interposed between the vanadium layer and this nickel layer or a two layer combination is interposed consistenting of tungsten and platinum with tungsten adjoining the vanadium layer and platinum adjoining the nickel layer.

These layers may be individually applied, for example, through vapor depositing, thermal spraying, chemical depositing or as a foil or as a combination of any of the foregoing. The layer thicknesses may differ depending upon the particular materials. Generally speaking, the layer should arranged from 1,000 to 10,000 Angstrom in the case of a vapor deposited layer; a thermally sprayed-on layer should be about 0.1 mm thick and foils should have a thickness within the range from 0.05 mm to 0.1 mm.

DESCRIPTION OF THE DRAWINGS

While the specification concludes with claims particularly pointing out and distinctly claiming the subject matter which is regarded as the invention, it is believed that the invention, the objects and features of the invention, and further object features and advantages thereof will better understood from the following description taken in connection the accompanying drawing in which:

FIGS. 8 and 8a are iron-vanadium phase diagram whereby FIG. 8a shows the left hand portion of FIG. 8 on a horizontally expanded scale as far as small percentages of added vanadium is concerned;

FIG. 9 is a vanadium-tungsten phase diagram;

Figure 1:
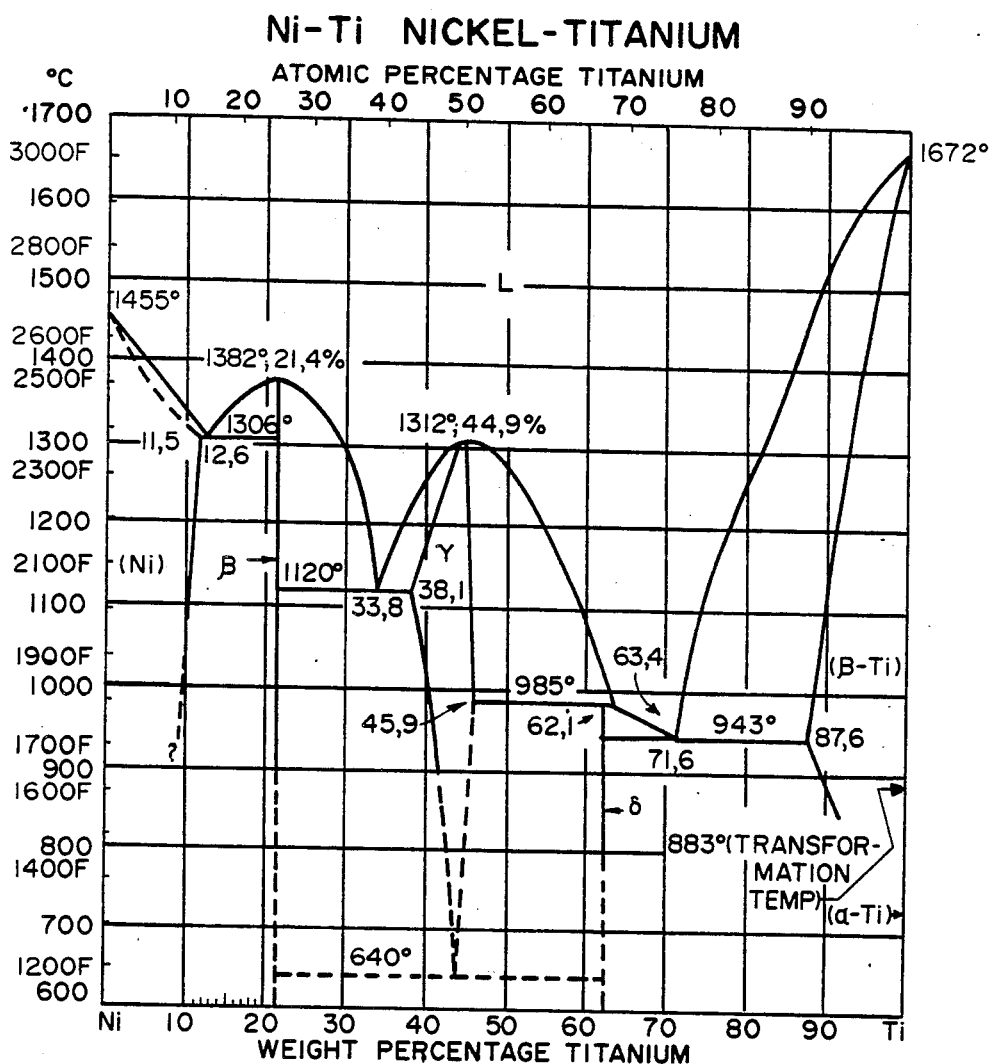
FIG. 1 is a nickel-titanium phase diagram wherein the nickel percentage decreases from left to right, the Figures in the abcissa indicating titanium accordingly. The ordinate shows temperature in Centigrade and Fahrenheight.
Figure 2:
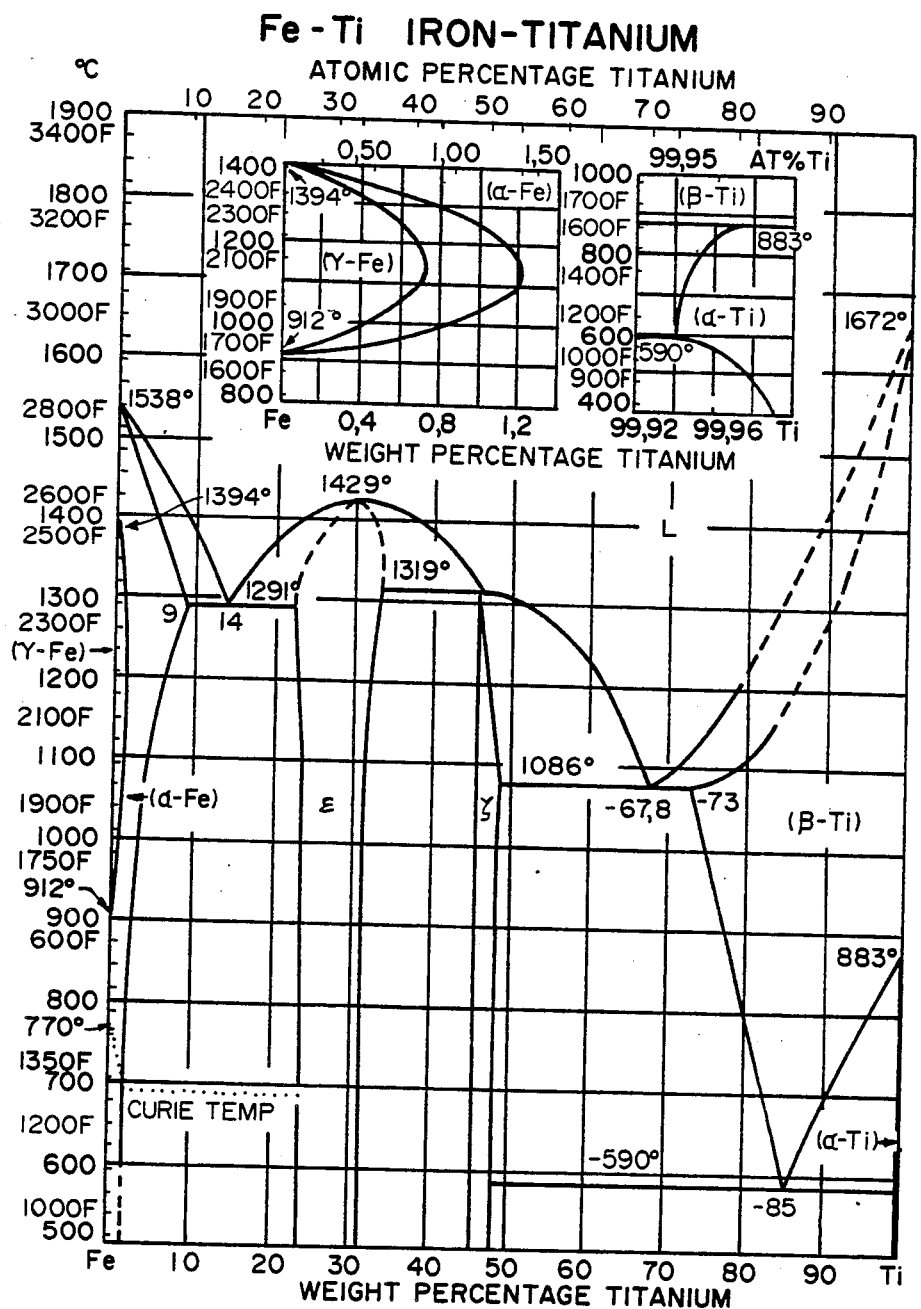
FIG. 2 is an analogous iron-titanium phase diagram.
Figure 3:
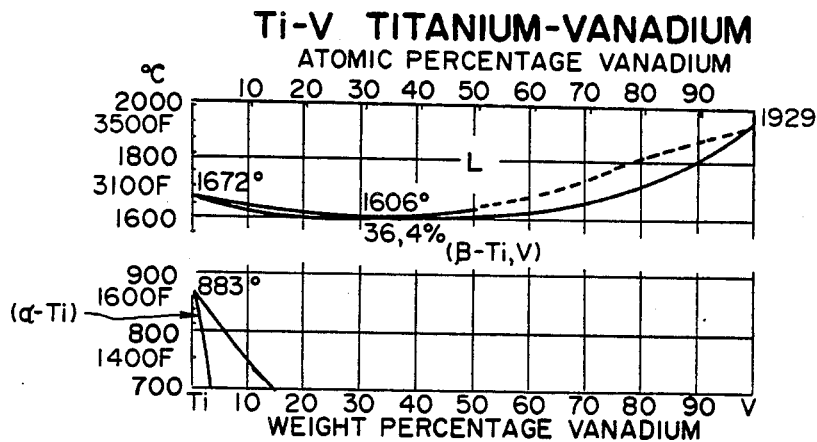
FIG. 3 is analogously a titanium-vanadium phase diagram.
Figure 4:
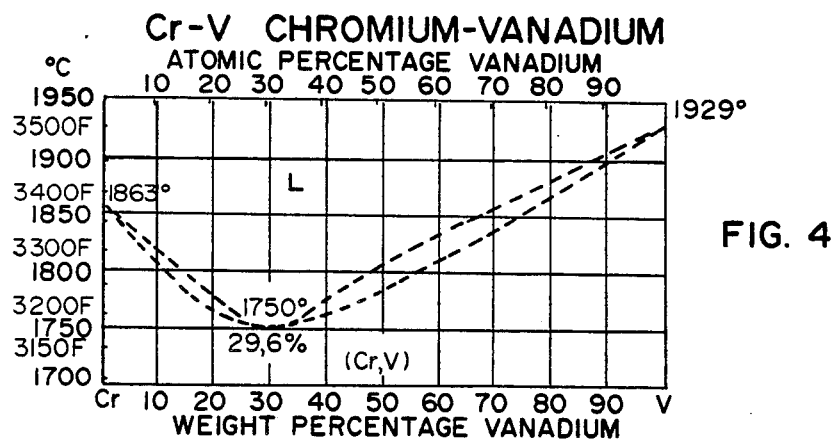
FIG. 4 is analogously a chromium-vanadium phase diagram.
Figure 5:
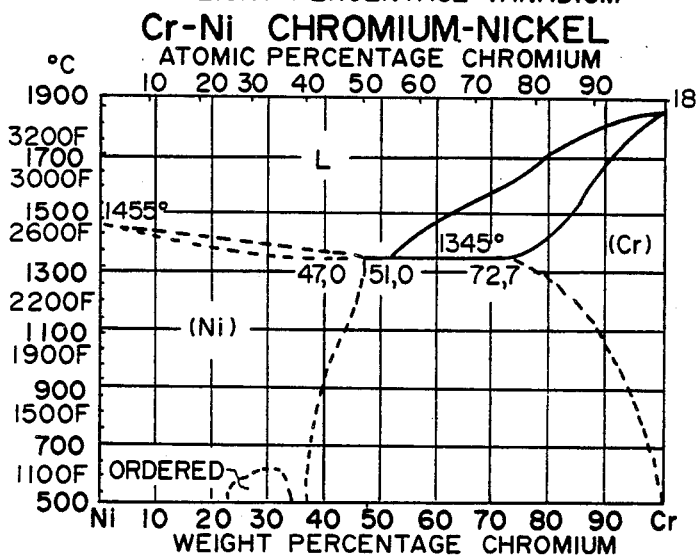
FIG. 5 is analogously a chromium-nickel phase diagram.
Figure 6:
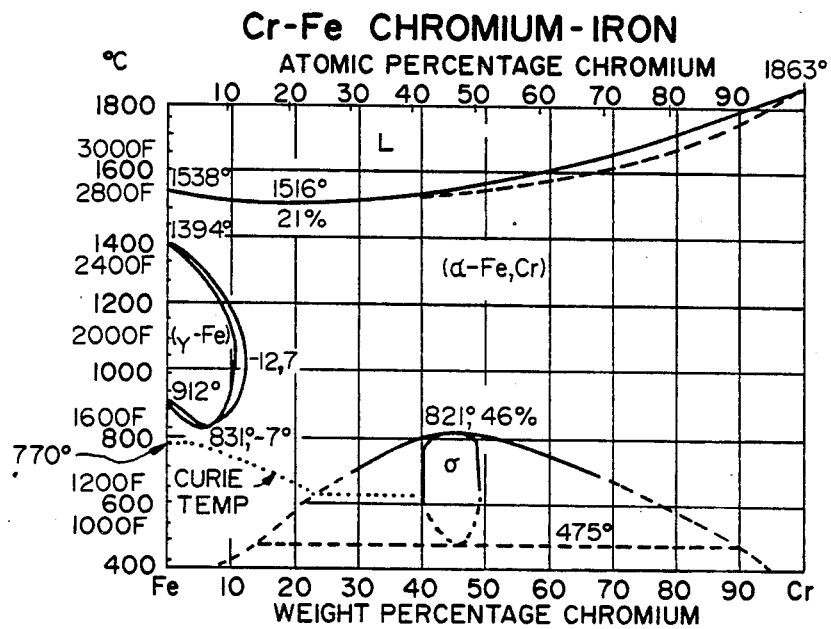
FIG. 6 is analogously a chromium-iron phase diagram.
Figure 7:
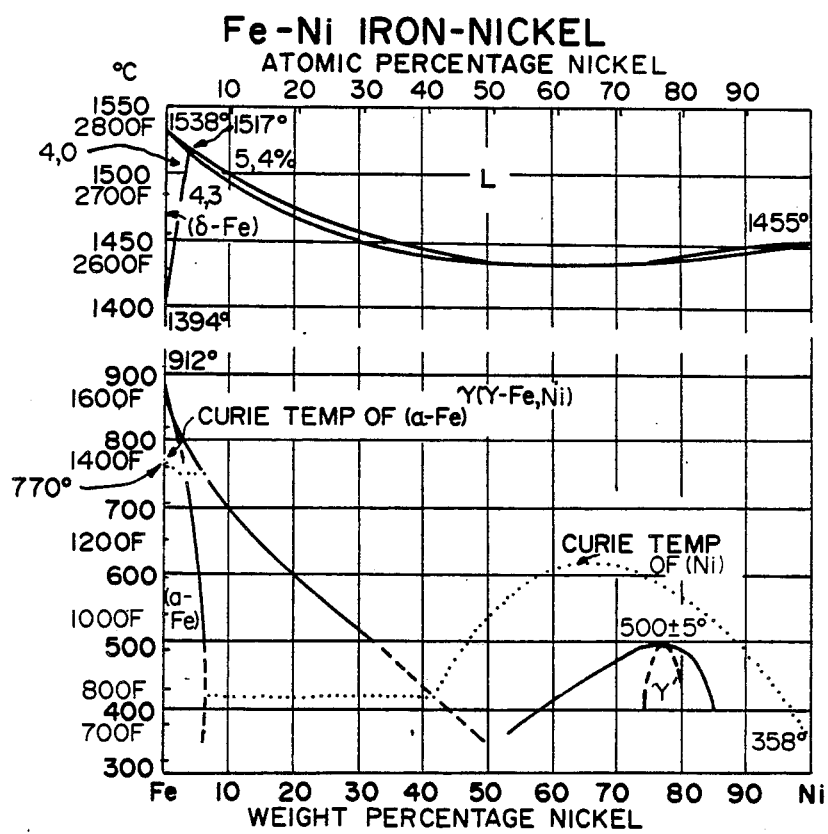
FIG. 7 is analogously an iron-nickel phase diagram.
Figure 10:
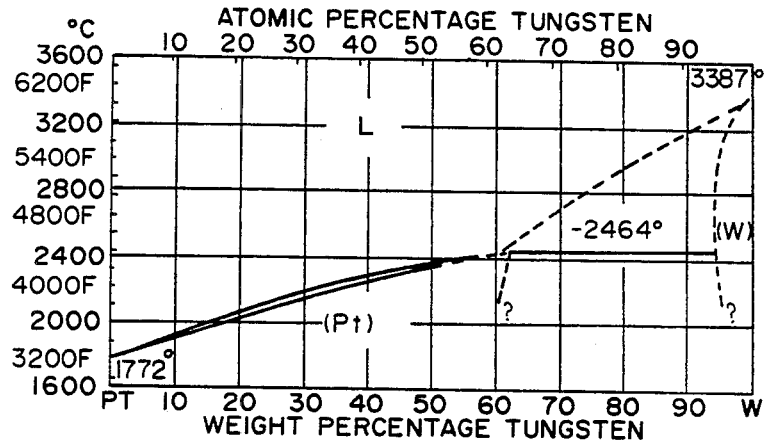
FIG. 10 is a platinum-tungsten phase diagram.
Figure 11:
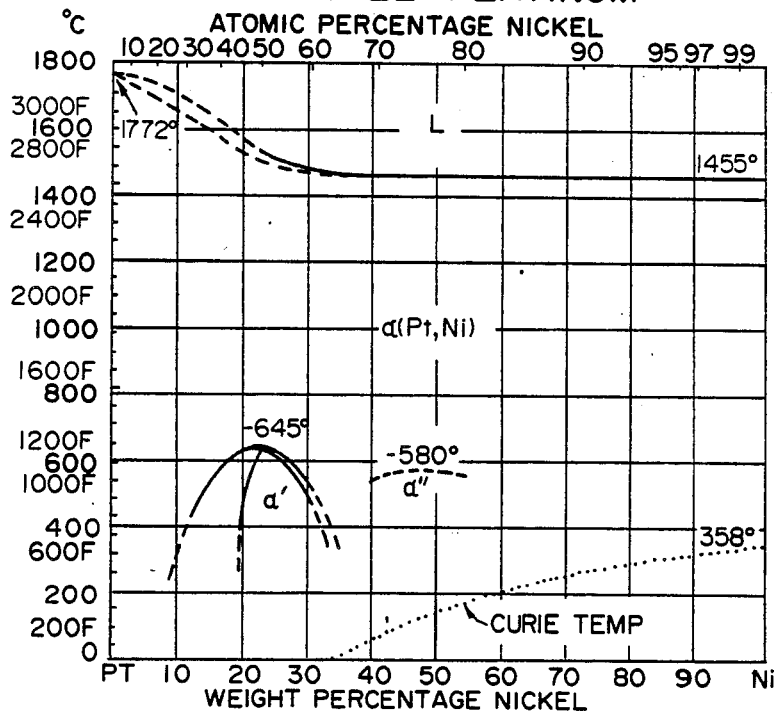
FIG. 11 is a nickel-platinum phase diagram.
Figure 12:
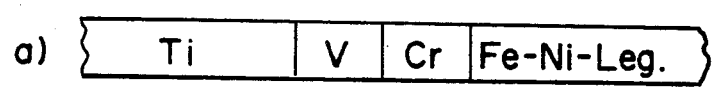
FIG. 12 shows in diagrams a, b, c and d four different suitable layer configurations as between a titanium or titanium alloy part and an iron-nickel alloy part.
Figure 12:
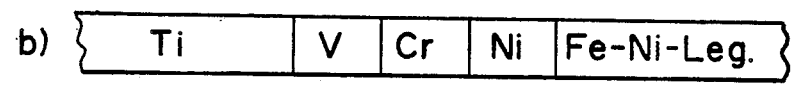
Figure 12:
Figure 12:
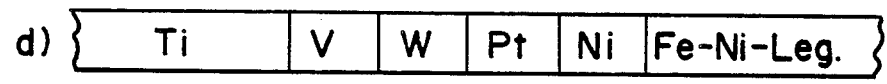

It was found that, in fact, the most suitable combination is vanadium-chromium-nickel interlayer configuration, i.e. a configuration shown in FIG. 12b showing a sequence wherein titanium joins vanadium followed by a chromium layer which in turn is followed by a nickel layer adjacent to which there is the iron-nickel part. For providing proper selection of the respective intermediate layer and layer materials, one has to observe that diffusion weldability is required with regard to titanium on one hand and iron-nickel on the other hand, which means that the melting temperature for the respective intermediate layers has to be in a temperature range which is close to the melting temperature of titanium on one hand and iron-nickel alloy on the other hand. This is necessary because there is a requirement for diffusion welding that the diffusion welding temperature must fall within the range from ½ to 4/5 of the melting temperature of the particular material. This rule has to be observed and the materials suggested here do, in fact, follow that rule. Moreover, for reasons of keeping costs and expenditure down, the entire bonding process, i.e. the making of the combination titanium-intermediate layers-iron-nickel alloy should be carried out by diffusion welding in one working step. If any of the intermediate layers has a significantly higher or lower melting temperature than any of the other materials involved, a fixed diffusion welding temperature will then yield only a poor bond.

The mechanical and chemical pretreatment of the surfaces to be welded has to follow suitable known methods whereby it should be observed that the maximum roughness peak-to-valley depth Rt must be smaller than 10 micrometers and, of course, a surface once cleaned has to be protected against future and subsequent oxidation. This can be obtained through storage of the cleaned and pickled surfaces in a container which contains acetone.

For making the titanium-nickel-iron alloy bond under utilization of the intermediate layer and through utilization of diffusion welding, the following parameters and methods should be considered suitable. The various parts which are to remain are deposited in a vacuum chamber in the stated sequence which is to be understood in the general sense, because it does not make any difference in principle whether any of the layers is physically placed on top of others as a foil or is vapor deposited thereon or is thermally sprayed thereon or is chemically plated thereon. In principle, either, any and all of these methods can be used, i.e. the method of the invention is not predicated on the observance of consistency as far as the particular placement procedure is concerned.

After all these parts have been suitably placed, the chamber containing them is evacuated, i.e. the pressure is lowered to a value below $1.33 \times 10^{-7}$ bar. Also, the parts so assembled are preheated dependent upon the overall volume so as to make sure that all surfaces which are to be welded to each other have assumed a diffusion welding temperature of 900° C. Now the welding proceeds through application of pressure using an areal press force of about 10 Newtons per square millimeter, and maintaining this force about 90 minutes, which is the diffusion welding time deemed necessary.

Following the welding, the pressure is still maintained but the parts are cooled still in vacuum to about 450° C. After this temperature has been obtained, air is charged into the chamber so that the part can now more conveniently cool to room temperature; the welding pressure is still maintained in order to make sure that the different thermal extension characteristics of the various materials thus are prone to produce internal stress, but maintaining the assembly under pressure compensates this tendency.

The invention is not limited to the embodiments described above but all changes and modifications thereof not constituting departures from the spirit and scope of the invention are intended to be included.

I claim:

1. Method of making a compound titanium or titanium alloy and iron-nickel alloy part comprising the steps of
   providing a titanium or titanium alloy portion of the compound part;
   providing the iron-nickel alloy compound portion of the compound part;
   providing at least two intermediate metallic layers for placement between the titanium or titanium alloy portion and the iron-nickel portion wherein the layer adjoining the titanium or titanium alloy portion is vanadium and the layer adjacent the iron-nickel alloy is one of the group consisting of the following, chromium, nickel, iron and diffusion welding all the parts together.

2. Method as in claim 1 wherein the layer adjacent the iron-nickel alloy is nickel, there being a chromium layer interposed between the vanadium and the nickel layer.

3. Method as in claim 1 wherein the layer adjacent the iron-nickel alloy is chromium abutting directly the vanadium layer.

4. Method as in claim 1 wherein the layer adjacent the iron-nickel alloy is an iron layer abutting directly the vanadium layer.

5. Method as in claim 1 wherein the layer adjacent the iron-nickel alloy is a nickel layer, there being a tungsten layer provided adjacent the vanadium layer and a platinum layer between the tungsten and the nickel layer.

6. Method as in claim 1 wherein the diffusion welding is carried out in vacuum at a pressure below $1.33 \times 10^{-7}$ bars at a temperature of 900° C. and an areal pressure, being applied to the parts of about 10 Newtons per square millimeter for 90 minutes.

7. Method as in claim 6 wherein following the diffusion welding the part is cooled to room temperature while maintaining said pressure.

8. Method as in claim 1 and including the step of mechanically cleaning the surfaces of the various parts and storing them temporarily in acetone in order to prevent oxidation and other impediments against diffusion.

9. Method as in claim 1 and including the step of chemically cleaning the surfaces of the various parts and storing them temporarily in acetone in order to prevent oxidation and other impediments against diffusion.

10. Method as in claim 1 as applied to the making of a compound part in which one part is a nickel iron alloy with equal parts iron and nickel.

11. Method as in claim 1 wherein at least one of the intermedatie layers is provided as a vapor depositing layer having a thickness from 1,000 to 10,000 Angstroms.

12. Method as in claim 1 including the step of providing at least one of the layers as a metal foil having a foil thickness from 0.05 to 0.1 mm.

13. Method as in claim 1 including the step of providing at least one of the layers through thermal spraying at a thickness at about 0.1 mm.

* * * * *